US012646709B2

(12) United States Patent
Lee et al.

(10) Patent No.: US 12,646,709 B2
(45) Date of Patent: Jun. 2, 2026

(54) ANODE ACTIVE MATERIAL COMPOSITION FOR LITHIUM SECONDARY BATTERY AND ANODE ELECTRODE AND LITHIUM SECONDARY BATTERY INCLUDING THE SAME

(71) Applicant: SK On Co., Ltd., Seoul (KR)

(72) Inventors: Yong Seok Lee, Daejeon (KR); Sung Do Kim, Daejeon (KR); Jae Ram Kim, Daejeon (KR); Jeong A Kim, Daejeon (KR); So Hyun Park, Daejeon (KR); Sang Won Bae, Daejeon (KR); Seung Deok Seo, Daejeon (KR); Ki Joo Eom, Daejeon (KR); Jong Hyuk Lee, Daejeon (KR); Hyun Joong Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/666,169

(22) Filed: May 16, 2024

(65) Prior Publication Data

US 2024/0387801 A1 Nov. 21, 2024

(30) Foreign Application Priority Data

May 16, 2023 (KR) ........................ 10-2023-0063067

(51) Int. Cl.
| | |
|---|---|
| *H01M 4/36* | (2006.01) |
| *H01M 4/02* | (2006.01) |
| *H01M 4/133* | (2010.01) |
| *H01M 4/134* | (2010.01) |
| *H01M 4/38* | (2006.01) |
| *H01M 4/583* | (2010.01) |
| *H01M 10/052* | (2010.01) |

(52) U.S. Cl.
CPC ........... *H01M 4/366* (2013.01); *H01M 4/133* (2013.01); *H01M 4/134* (2013.01); *H01M 4/386* (2013.01); *H01M 4/583* (2013.01); *H01M 10/052* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2013/0337325 A1 | 12/2013 | Jung et al. | |
| 2014/0050983 A1* | 2/2014 | Kim ..................... | H01M 4/133 |
| | | | 429/211 |
| 2018/0190975 A1 | 7/2018 | Ishii et al. | |
| 2019/0305293 A1* | 10/2019 | Sotowa ............. | H01M 10/0562 |
| 2020/0185719 A1 | 6/2020 | Piao et al. | |
| 2020/0194749 A1 | 6/2020 | Ogata et al. | |
| 2022/0293941 A1 | 9/2022 | Yamamoto et al. | |
| 2022/0336810 A1 | 10/2022 | Hwang et al. | |
| 2023/0110233 A1 | 4/2023 | Park et al. | |

FOREIGN PATENT DOCUMENTS

| | | |
|---|---|---|
| CN | 110444746 A | 11/2019 |
| CN | 115966662 A | 4/2023 |
| EP | 3961758 A1 | 3/2022 |
| EP | 4283704 A2 | 11/2023 |
| JP | 2002-056843 A | 2/2002 |
| JP | 5998406 B2 | 9/2016 |
| JP | 2022-531640 A | 7/2022 |
| KR | 10-2018-0015251 A | 2/2018 |
| KR | 10-2019-0049585 A | 5/2019 |
| KR | 10-2132618 B1 | 7/2020 |
| KR | 10-2021-0009468 A | 1/2021 |
| KR | 10-2021-0115461 A | 9/2021 |
| KR | 10-2021-0144692 A | 11/2021 |
| KR | 10-2022-0144097 A | 10/2022 |
| WO | WO-2019200219 A1 * | 10/2019 .......... H01M 10/052 |

OTHER PUBLICATIONS

Extended European Search Report for European Patent Application No. 24175549.5 issued by the European Patent Office on Dec. 9, 2024.
Office Action for Chinese Patent Application No. 202410601274.X issued by the Chinese Patent Office on Jan. 17, 2025.

* cited by examiner

*Primary Examiner* — Zhongqing Wei
(74) *Attorney, Agent, or Firm* — IP & T GROUP LLP

(57) ABSTRACT

An anode active material composition for a lithium secondary battery includes a carbon-based anode active material and a silicon-based anode active material, wherein the carbon-based anode active material has an orientation ($I_{004}/I_{110}$, here, $I_{004}$ is a peak intensity of the (004) plane when measuring X-ray diffraction (XRD) of the carbon-based anode active material, and $I_{110}$ is a peak intensity of the (110) plane when measuring XRD of the carbon-based anode active material) of 2.85 or less measured by XRD.

8 Claims, No Drawings

ANODE ACTIVE MATERIAL COMPOSITION FOR LITHIUM SECONDARY BATTERY AND ANODE ELECTRODE AND LITHIUM SECONDARY BATTERY INCLUDING THE SAME

CROSS-REFERENCE TO RELATED APPLICATION(S)

This patent document claims the priority and benefits of Korean Patent Application No. 10-2023-0063067 filed on May 16, 2023, the disclosure of which is incorporated herein by reference in its entirety.

TECHNICAL FIELD

The technology and implementations disclosed in this patent document generally relate to an anode active material composition for a lithium secondary battery, and an anode electrode and a lithium secondary battery including the same.

BACKGROUND

As interest in environmental issues has grown recently, exhaust gases emitted from vehicles using fossil fuels, such as gasoline or diesel, have been identified as one of the main causes of air pollution, and research into electric vehicles (EVs), hybrid electric vehicles (HEV), etc. have been extensively conducted as an alternatives.

In addition, lithium secondary batteries with a high discharge voltage and output stability have been mainly used as power sources for electric vehicles (EV), hybrid electric vehicles (HEV), etc. In addition, as the need for high-energy secondary batteries with high energy density has increased, development and research into high-capacity anodes therefor has also been actively underway. Accordingly, recently, in order to implement secondary batteries with high capacity and high energy density, silicon-based anode active materials, which have a high discharge capacity compared to carbon-based anode active materials, have been applied to anode electrodes for secondary batteries.

However, when a silicon-based anode active material is applied to anode electrodes, the current density applied to the carbon-based anode active material increases, which reduces the durability of anode electrodes, and as a result, resistance characteristics and lifespan characteristics of lithium secondary batteries may deteriorate.

SUMMARY

The disclosed technology may be implemented in some exemplary embodiments to provide an anode active material composition for a lithium secondary battery, capable of improving resistance characteristics and lifespan characteristics of a secondary battery, and an anode electrode and lithium secondary battery including the same.

In some exemplary embodiments of the disclosed technology, an anode active material composition for a lithium secondary battery includes a carbon-based anode active material and a silicon-based anode active material, wherein the carbon-based anode active material has an orientation ($I_{004}/I_{110}$, where $I_{004}$ is a peak intensity of the (004) plane when measuring X-ray diffraction (XRD) of the carbon-based anode active material, and $I_{110}$ is a peak intensity of the (110) plane when measuring XRD of the carbon-based anode active material) of 2.85 or less measured by XRD.

The silicon-based anode active material may include SiC or SiOx ($0<x<2$). SiC refers to a porous structure including carbon-based particles including pores and a silicon-based coating layer formed on the pores or surfaces of the carbon-based particles, in the present disclosures.

The silicon-based anode active material may be included in an amount of 2 wt % or more, based on a total weight of the anode active material composition.

The silicon-based anode active material may include SiC having a porous structure.

The silicon-based anode active material may include carbon-based particles including pores and a silicon-based coating layer formed on the pores or surfaces of the carbon-based particles.

In some exemplary embodiments of the disclosed technology, an anode electrode for a lithium secondary battery includes an anode current collector and an anode mixture layer formed on at least one surface of the anode current collector, wherein the anode mixture layer includes the anode active material composition of claim 1, an anode conductive material, and an anode binder.

The anode mixture layer may be provided in two or more layers on the anode current collector.

In some exemplary embodiments of the disclosed technology, a lithium secondary battery includes the anode electrode described above.

DETAILED DESCRIPTION

Hereinafter, various exemplary embodiments according to the present disclosure are described. However, the exemplary embodiments may be modified into various other forms and the scope is not limited to the exemplary embodiments described below.

Anode Electrode for Lithium Secondary Battery

An anode electrode for a lithium secondary battery according to the present disclosure may include an anode current collector and an anode mixture layer formed on at least one surface of the anode current collector.

The anode mixture layer may include an anode active material composition, an anode conductive material, and an anode binder.

Anode Active Material Composition

An anode active material composition may include a carbon-based anode active material and a silicon-based anode active material.

The carbon-based anode active material may include, for example, at least one selected from the group consisting of artificial graphite, natural graphite, hard carbon, soft carbon, carbon black, acetylene black, Ketjen black, Super P, graphene, and fibrous carbon but is not limited thereto.

In exemplary embodiments, the carbon-based anode active material may include artificial graphite alone or may include artificial graphite and natural graphite.

The silicon-based anode active material that may be commonly used as an anode active material may be suitably used in the present disclosure, and may include, for example, at least one species selected from the group consisting of, SiC, SiOx ($0<x<2$), Si—Y alloy (here, Y is an element selected from the group consisting of alkali metal, alkaline earth metal, transition metal, a Group 13 element, a Group 14 element, a rare earth element, and combinations thereof, but not Si), Si—C complex, and pure Si.

In exemplary embodiments, the silicon-based anode active material may include SiC or SiOx ($0<x<2$).

In an exemplary embodiment, the silicon-based anode active material may be SiC having a porous structure. In detail, the silicon-based anode active material may include carbon-based particles including pores and a silicon-based coating layer formed on the pores or surfaces of the carbon-based particles. The silicon-based anode active material may have a porous structure, and thus, volume expansion of the silicon-based anode active material during charging and discharging of the secondary battery may be suppressed, thereby improving resistance characteristics and lifespan characteristics of the secondary battery, and initial charge/discharge efficiency of the silicon-based anode active material may be improved, thereby improving initial efficiency of the secondary battery.

In an exemplary embodiment, the anode active material composition may include 2 wt % or more of the silicon-based anode active material based on the total weight of the anode active material composition. Meanwhile, since the anode active material composition includes the silicon-based anode active material, discharge capacity of the anode electrode including the anode active material composition may be improved. If the anode active material composition includes less than 2 wt % of the silicon-based anode active material based on the total weight of the anode active material composition, the content of the silicon-based anode active material included in the anode active material composition may be small and the discharge capacity of the anode electrode may not be improved sufficiently.

In exemplary embodiments, the carbon-based anode active material may have an orientation ($I_{004}/I_{110}$, here, $I_{004}$ is a peak intensity of the (004) plane when measuring X-ray diffraction (XRD) of the carbon-based anode active material, and $I_{110}$ is a peak intensity of the (110) plane when measuring XRD of the carbon-based anode active material) measured by XRD, and the orientation degree ($I_{004}/I_{110}$) may be a low value. Meanwhile, if the content of the silicon-based anode active material in the anode active material composition increases, the current density applied to the carbon-based anode active material may increase, thereby reducing the durability of the anode electrode including the anode active material composition, and as a result, the resistance characteristics and lifespan characteristics of the secondary battery may deteriorate. However, since the carbon-based anode active material has a low orientation ($I_{004}/I_{110}$), the intercalation and deintercalation characteristics of lithium ions into the carbon-based anode active material may be improved. Accordingly, even if the current density applied to the carbon-based anode active material increases due to an increase in the content of the silicon-based anode active material in the anode active material composition, the anode electrode may secure excellent durability, thereby improving the resistance characteristics and lifespan characteristics of the secondary battery.

In an exemplary embodiment, the carbon-based anode active material may have an orientation ($I_{004}/I_{110}$) of about 2.85 or less as measured by XRD. If the carbon-based anode active material has an orientation ($I_{004}/I_{110}$) greater than about 2.85 as measured by XRD, the intercalation and deintercalation characteristics of lithium ions into the carbon-based anode active material may deteriorate, thereby reducing the durability of the anode electrode and resultantly degrading the resistance characteristics and lifespan characteristics of the secondary battery.

In an exemplary embodiment, the anode electrode may have a density of about 1.4 to about 1.7 $g/cm^3$.

In an exemplary embodiment, the anode active material composition may be about 90 to about 98 wt % based on the total weight of the anode mixture layer.

As described above, the anode active material composition may include the carbon-based anode active material and the silicon-based anode active material, and the carbon-based anode active material may have a low orientation. Accordingly, even if the content of the silicon-based anode active material in the anode active material composition increases, the anode electrode may secure durability, and thus, the resistance characteristics and lifespan characteristics of the secondary battery may be improved.

Anode Conductive Material

An anode conductive material is used to provide conductivity to the anode electrode, and an anode conductive material commonly used in secondary batteries may be used without limitation. The anode conductive material may include, for example, one or more selected from the group consisting of graphite, carbon black, carbon nanotubes, metal powder, and conductive oxide.

In an exemplary embodiment, the anode conductive material may be about 0.1 to about 3 wt % based on the total weight of the anode mixture layer.

Anode Binder

The anode binder may not be particularly limited as long as it is a component that assists the bonding of the anode active material composition, the anode conductive material, etc., and the bonding to the anode current collector. The anode binder may include at least one selected from the group consisting of a rubber-based binder and a water-soluble polymer-based binder.

As the rubber-based binder, a binder which is insoluble in aqueous solvents, such as water, but has water dispersibility that allows smooth dispersion in aqueous solvents may be used. For example, the rubber-based binder may include at least one selected from, for example, styrene butadiene rubber (SBR), hydrogenated nitrile butadiene rubber (HNBR), acrylonitrile butadiene rubber, acrylic rubber, butyl rubber, and fluoro rubber. Specifically, in terms of easy dispersion and excellent phase stability, the rubber-based binder may include at least one selected from the group consisting of styrene butadiene rubber and hydrogenated nitrile butadiene rubber.

In addition, the water-soluble polymer-based binder may be dissolved in aqueous solvents, such as water, and may include at least one selected from the group consisting of polyvinyl alcohol (PVA), polyacrylic acid (PAA), polyethylene glycol (PEG), polyacrylonitrile (PAN), polyacryl amide (PAM), and carboxymethyl cellulose (CMC).

In an exemplary embodiment, the anode binder may be about 2 to about 5 wt % based on the total weight of the anode mixture layer.

Anode Mixture Layer

In exemplary embodiments, the anode mixture layer may be provided in two or more layers on the anode current collector. In an exemplary embodiment, when the anode mixture layer is provided in two layers, a first anode mixture layer may be disposed on at least one surface of the anode current collector, and a second anode mixture layer may be disposed on the first anode mixture layer. The first anode mixture layer and the second anode mixture layer may each include the anode active material composition, the anode conductive material, and the anode binder.

Anode Current Collector

The anode current collector may be any anode current collector which is commonly used in the production of anode electrodes of secondary batteries and has conductivity without causing chemical changes within the secondary battery. The current collector may include a current collector formed of stainless steel, aluminum, nickel, titanium, calcined carbon, copper or stainless steel surface-treated with carbon, nickel, titanium, silver, etc. or aluminum-cadmium alloy, etc. In addition, bonding power of the anode active material may be strengthened by forming fine irregularities on the surface, and various forms, such as films, sheets, foils, nets, porous materials, foams, and non-woven fabrics may be used.

Meanwhile, a method of manufacturing an anode electrode for the lithium secondary battery is not particularly limited. As an example, the anode electrode may be manufactured by applying an anode slurry including the anode active material composition, the anode conductive material, the anode binder, a solvent, etc. to the anode current collector by a method, such as bar coating, casting, or spraying, and drying the same at about 70 to 100° C. to form the anode mixture layer.

The solvent may be, for example, dimethyl sulfoxide (DMSO), isopropyl alcohol, N-methylpyrrolidone (NMP), acetone, or water. The solvent may be used in the amount by which an active material, a conductive material, a binder are dissolved or dispersed in consideration of an application thickness of a composition for forming an anode mixture layer and manufacturing yield and by which viscosity exhibiting excellent thickness uniformity is achieved when the solvent is subsequently applied to form an anode mixture layer.

Lithium Secondary Battery

A lithium secondary battery may include an anode electrode for the lithium secondary battery. Specifically, the lithium secondary battery may include an anode electrode 100 and a cathode electrode for a lithium secondary battery according to any one of the above-described exemplary embodiments, and may further include or may not include a separator interposed between the cathode electrode and the anode electrode optionally.

The cathode electrode may include lithium-transition metal complex oxide as an active material. Specifically, the lithium-transition metal complex oxide may be an NCM-based positive active material represented by the chemical formula is LixNiaCobMncOy ($0<x\leq1.1$, $2\leq y\leq2.02$, $0<a<1$, $0<b<1$, $0<c<1$, $0<a+b+c\leq1$), or a lithium iron phosphate (LFP)-based cathode active material represented by the chemical formula LiFePO$_4$.

The separator may include a porous polymer film formed of polyolefin-based polymers, such as ethylene homopolymer, propylene homopolymer, ethylene/butene copolymer, ethylene/hexene copolymer, and ethylene/methacrylate copolymer. In addition, the separator may include a non-woven fabric formed of high melting point glass fiber, polyethylene terephthalate fiber, etc.

EXAMPLES

Hereinafter, the present disclosure is described in more detail through examples. The following examples represent examples of the present disclosure and are not intended to limit the present disclosure thereby.

Examples 1 to 5 and Comparative Examples 1 to 6

An anode slurry was prepared by mixing an anode active material composition including artificial graphite as a carbon-based anode active material and SiC as a silicon-based anode active material, CNT as an anode conductive material, and SBR as an anode binder with water as a solvent. At this time, the anode slurry includes 98 wt % of the anode active material composition, 0.1 wt % of the anode conductive material, and 1.9 wt % of the anode binder based on the total weight of the anode slurry.

In addition, the anode active material compositions of Examples 1 to 5 and Comparative Examples 1 to 6 include SiC or SiOx ($0<x<2$) in the amounts shown in Table 1 below based on the total weight of the anode active material composition. At this time, SiC refers to a porous structure including carbon-based particles including pores and a silicon-based coating layer formed on the pores or surfaces of the carbon-based particles.

Thereafter, the prepared anode slurry was applied on a copper foil, which is an anode current collector, and then dried at 80° C. to manufacture an anode electrode.

Thereafter, a sample was collected from the anode using a scraper, and the orientation ($I_{004}/I_{110}$) of the artificial graphite was measured using XRD equipment (Empyrean by PANalytical). At this time, the measurement conditions were $2\theta=10°$ to 80°, a scan speed (°/S)=3, and a step size was 0.025°/step.

The results of measuring the orientation of the artificial graphite included in the anode active material compositions of Examples 1 to 5 and Comparative Examples 1 to 6 are shown in Table 1 below.

TABLE 1

| | Orientation of artificial graphite ($I_{004}/I_{110}$) | SiC content (wt %) | SiOx content (wt %) |
|---|---|---|---|
| Example 1 | 2.09 | 11 | — |
| Example 2 | 2.36 | 11 | — |
| Example 3 | 2.85 | 2 | — |
| Example 4 | 2.07 | — | 11 |
| Example 5 | 2.81 | — | 6 |
| Comparative Example 1 | 3.12 | 11 | — |
| Comparative Example 2 | 4.37 | 11 | — |
| Comparative Example 3 | 3.12 | 13 | — |
| Comparative Example 4 | 3.40 | 1 | — |
| Comparative Example 5 | 3.82 | — | 11 |
| Comparative Example 6 | 3.52 | — | 6 |

Evaluation of Battery Performance

A cathode electrode was manufactured by applying a slurry including an NCM-based active material, which is a lithium-transition metal complex oxide, on aluminum foil and then dried.

Electrode assemblies were prepared using the prepared cathode electrode and the anode electrodes including the anode active material compositions of Examples 1 to 5 and Comparative Examples 1 to 6 with a polyolefin separator therebetween, the electrode assemblies were introduced into pouches for a secondary battery, an electrolyte solution in which 1M LiPF$_6$ was dissolved was injected to a mixed solvent of ethylene carbonate (EC) and diethyl carbonate (DEC), respectively, which were then sealed to manufacture pouch-type lithium secondary batteries of Examples 1-1 to 5-1 and Comparative Examples 1-1 to 6-1.

Internal resistance, room temperature capacity retention rate, and rapid charge capacity retention rate were evaluated for each pouch-type lithium secondary battery manufactured above, and the results are shown in Table 2. The evaluation method for each battery performance is as follows.

1) Internal Resistance

For the lithium secondary batteries of Examples 1-1 to 5-1 and Comparative Examples 1-1 to 6-1, direct current internal resistance (DC-IR) was measured by performing discharging by 10 S at a 1 C current rate (1 C-rate) of a charge/discharge rate in a state of charge (SoC) 50%.

2) Room Temperature (25° C.) Capacity Retention Rate

A discharge capacity of each of the lithium secondary batteries of Examples 1-1 to 5-1 and Comparative Examples 1-1 to 6-1 was measured by repeatedly performing discharging at 2.5V at 0.3 C at a temperature of 25° C., charging at constant current (CC) to 4.2V, and then charging constant voltage (CV) at 0.05 C. Based on the measured discharge capacities of the lithium secondary batteries, 0.33 C CC/CV charging and 0.5 C discharging were repeated 400 times in the SoC range of 4 to 98%, and the capacity retention rate when evaluating room temperature lifespan characteristics of each lithium secondary battery was measured.

3) Rapid Charge Capacity Retention Rate

For the lithium secondary batteries of Examples 1-1 to 5-1 and Comparative Examples 1-1 to 6-1, a depth of discharge (DOD) of 72% was reached within 35 minutes with a charge pattern in which the charge/discharge rate was changed at a temperature of 25° C., and discharging was performed at a charge/discharge rate of 0.33 C, and after repeating the charging and discharging 300 times, a discharge capacity retention rate was compared to the initial discharge capacity measured in 8, and the rapid charge capacity retention rate was evaluated.

TABLE 2

| | DC-IR (mΩ) | Room temperature capacity retention rate (%) | Rapid charge capacity retention rate (%) |
|---|---|---|---|
| Example 1-1 | 0.90 | 92.0 | 95.0 |
| Example 2-1 | 0.93 | 90.0 | 92.0 |
| Example 3-1 | 0.95 | 91.0 | 93.0 |
| Example 4-1 | 0.95 | 91.0 | 92.0 |
| Example 5-1 | 0.98 | 90.0 | 90.5 |
| Comparative Example 1-1 | 0.95 | 85.0 | 89.0 |
| Comparative Example 2-1 | 0.98 | 82.0 | 80.0 |
| Comparative Example 3-1 | 1.02 | 77.0 | 80.2 |
| Comparative Example 4-1 | 1.01 | 84.0 | 85.0 |
| Comparative Example 5-1 | 1.05 | 83.0 | 80.0 |
| Comparative Example 6-1 | 1.03 | 85.0 | 82.0 |

As can be seen from Table 2, it was confirmed that the secondary batteries of Examples 1-1 to 5-1 had higher room temperature capacity retention rate and rapid charge capacity retention rate than the secondary batteries of Comparative Examples 1-1 to 6-1. In addition, it was confirmed that the secondary batteries of Examples 1-1 and 2-1 had lower DC-IR than the secondary batteries of Comparative Examples 1-1 to 6-1, the secondary batteries of Examples 3-1 and 4-1 had lower DC-IR than the secondary batteries of Comparative Examples 2-1 to 6-1, and the secondary battery of Example 5-1 has a lower DC-IR than the secondary batteries of Comparative Example 3-1 to 6-1. From this, it can be seen that the secondary battery according to the present disclosure has improved resistance characteristics and lifespan characteristics by including the anode active material composition including a carbon-based anode active material with an orientation of 2.85 or less.

In addition, it was confirmed that the secondary batteries of Examples 1-1 to 5-1 included the anode active material compositions of Examples 1 to 5 including 2 wt % or more of a silicon-based anode active material based on the total weight of the anode active material composition, respectively. From this, it can be seen that the secondary battery according to the present disclosure has improved resistance characteristics and improved lifespan characteristics by including the anode active material composition including the carbon-based anode active material having an orientation of 2.85 or less and 2 wt % of more of silicon-based anode active material based on the total weight of the anode active material composition.

The anode active material composition for a lithium secondary battery according to the present disclosure includes the carbon-based anode active material and the silicon-based anode active material, and the carbon-based anode active material may have a low value of orientation. Accordingly, even if the content of the silicon-based anode active material in the anode active material composition increases, the anode electrode may secure durability, and thus, the resistance characteristics and lifespan characteristics of the secondary battery may be improved.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The particular implementations shown and described herein are illustrative examples of the invention and are not intended to otherwise limit the scope of the invention in any way. Moreover, no item or component is essential to the practice of the invention unless the element is specifically described as "essential" or "critical."

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present disclosure.

What is claimed is:

1. An anode active material composition for a lithium secondary battery, the anode active material composition comprising:

a carbon-based anode active material and a silicon-based anode active material, wherein the carbon-based anode active material has an orientation, expressed as $I_{004}/I_{110}$, of 2.85 or less measured by X-ray diffraction (XRD), here, $I_{004}$ is a peak intensity of the (004) plane when measuring XRD of the carbon-based anode active material, and $I_{110}$ is a peak intensity of the (110) plane when measuring XRD of the carbon-based anode active material, wherein the silicon-based anode active material includes carbon-based particles including pores and a silicon-based coating layer formed on the pores or surfaces of the carbon-based particles.

2. The anode active material composition of claim 1, wherein the silicon-based anode active material further includes $SiO_x$, wherein $0<x<2$.

3. The anode active material composition of claim 2, wherein the silicon-based anode active material is included in an amount of 2 wt % or more, based on a total weight of the anode active material composition.

4. An anode electrode for a lithium secondary battery, the anode electrode comprising:

an anode current collector; and an anode mixture layer formed on at least one surface of the anode current collector, wherein the anode mixture layer includes the anode active material composition of claim 1, an anode conductive material, and an anode binder.

5. The anode electrode of claim 4, wherein the anode mixture layer is provided in two or more layers on the anode current collector.

6. A lithium secondary battery comprising the anode electrode of claim 4.

7. The anode active material composition of claim 1, wherein the silicon-based anode active material has a porous structure.

8. The anode active material composition of claim 1, wherein the carbon-based anode active material has an orientation of 2.09 or less measured by X-ray diffraction.

* * * * *